US012658472B2

(12) United States Patent
Hayashi et al.

(10) Patent No.: US 12,658,472 B2
(45) Date of Patent: Jun. 16, 2026

(54) SOLID ELECTROLYTE MATERIAL AND BATTERY USING SAME

(71) Applicant: Panasonic Intellectual Property Management Co., Ltd., Osaka (JP)

(72) Inventors: Yohei Hayashi, Osaka (JP); Koki Ueno, Osaka (JP); Kazuhide Ichikawa, Kyoto (JP); Tetsuya Asano, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 715 days.

(21) Appl. No.: 17/946,536

(22) Filed: Sep. 16, 2022

(65) Prior Publication Data

US 2023/0021952 A1 Jan. 26, 2023

Related U.S. Application Data

(63) Continuation of application No. PCT/JP2021/004427, filed on Feb. 5, 2021.

(30) Foreign Application Priority Data

Mar. 31, 2020 (JP) ................................ 2020-064811

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
CPC ... H01M 2300/008; H01M 2300/0065; H01M 2300/0068; H01M 10/0525;
(Continued)

(56) References Cited

U.S. PATENT DOCUMENTS 4,345,010 A * 8/1982 Glugla .............. H01M 10/0566 429/334
5,545,497 A * 8/1996 Takeuchi .............. H01M 4/483 429/219
(Continued)

FOREIGN PATENT DOCUMENTS

DE 3020198 A1 2/1981
GB 2056752 A 3/1981
(Continued)

OTHER PUBLICATIONS

Liang, C. C. and Jow, T.R. Proceedings of the symposium on power sources for biomedical implantable applications and ambient temperature lithium batteries. Conduction characteristic of lithium chloroaluminate (Li2Al2Cl6) solid. 80, 4, 264-269. (Year: 1980).*
(Continued)

*Primary Examiner* — Marla D Mcconnell
*Assistant Examiner* — Julia S Caserto
(74) *Attorney, Agent, or Firm* — Rimon P.C.

(57) ABSTRACT

A solid electrolyte material is represented by the following composition formula (1), $Li_aAl_bO_cX_d$ . . . Formula (1), where values a, b, c, and d are each greater than 0, and X is at least one selected from the group consisting of Cl and Br. A battery includes a positive electrode, a negative electrode and an electrolyte layer disposed between the positive electrode and the negative electrode. At least one selected from the group consisting of the positive electrode, the negative electrode, and the electrolyte layer includes the solid electrolyte material.

9 Claims, 5 Drawing Sheets

(58) Field of Classification Search
CPC .......... H01M 10/0561; H01M 10/0562; C01D 1/02; C01D 15/00; C01D 15/02; C01D 15/04; C01P 2002/70; C01P 2002/72; C01P 2002/74
See application file for complete search history.

(56) References Cited

U.S. PATENT DOCUMENTS

| | | | | |
|---|---|---|---|---|
| 2012/0301796 | A1 | 11/2012 | Ohtomo et al. | |
| 2018/0138496 | A1* | 5/2018 | Ikeuchi | H01M 4/131 |
| 2020/0328457 | A1 | 10/2020 | Sakai et al. | |
| 2021/0167447 | A1* | 6/2021 | Ma | H01G 11/56 |

FOREIGN PATENT DOCUMENTS

| | | | |
|---|---|---|---|
| JP | 2011-129312 | A | 6/2011 |
| JP | 2018-085324 | A | 5/2018 |
| JP | 2020-064811 | * | 3/2020 |
| WO | 2019/135318 | A1 | 7/2019 |

OTHER PUBLICATIONS

Han, F. et al. A Battery Made from a Single Material. Advanced Materials. 27, 23, 3473-3483 (Year: 2015).*
Extended European Search Report dated Aug. 31, 2023 issued in the corresponding European Patent Application No. 21781260.1.
H. Lewis et al., "An Unusual Self-Discharge of a Field Lithium-Thionyl Chloride Battery Submodule", Proceedings of the Tenth Annual Battery Conference on Applications and Advances, pp. 291-294, 1995.
International Search Report issued on Apr. 6, 2021 in International Patent Application No. PCT/JP2021/004427, with English translation.

* cited by examiner

SOLID ELECTROLYTE MATERIAL AND BATTERY USING SAME

This application is a continuation of PCT/JP2021/004427 filed on Feb. 5, 2021, which claims foreign priority of Japanese Patent Application No. 2020-064811 filed on Mar. 31, 2020, the entire contents of both of which are incorporated herein by reference.

BACKGROUND OF THE INVENTION

1. Field of the Invention

The present disclosure relates to a solid electrolyte material and a battery using the same.

2. Description of Related Art

JP 2011-129312 A discloses an all-solid-state battery using a sulfide solid electrolyte material.

SUMMARY OF THE INVENTION

The present disclosure aims to provide a novel solid electrolyte material having high utility.

A solid electrolyte material of the present disclosure is represented by the following composition formula (1), Formula (1)

$$Li_aAl_bO_cX_d$$

where values a, b, c, and d are each greater than 0, and X is at least one selected from the group consisting of CI and Br.

The present disclosure provides a novel solid electrolyte material having high utility.

DETAILED DESCRIPTION

Figure 1:
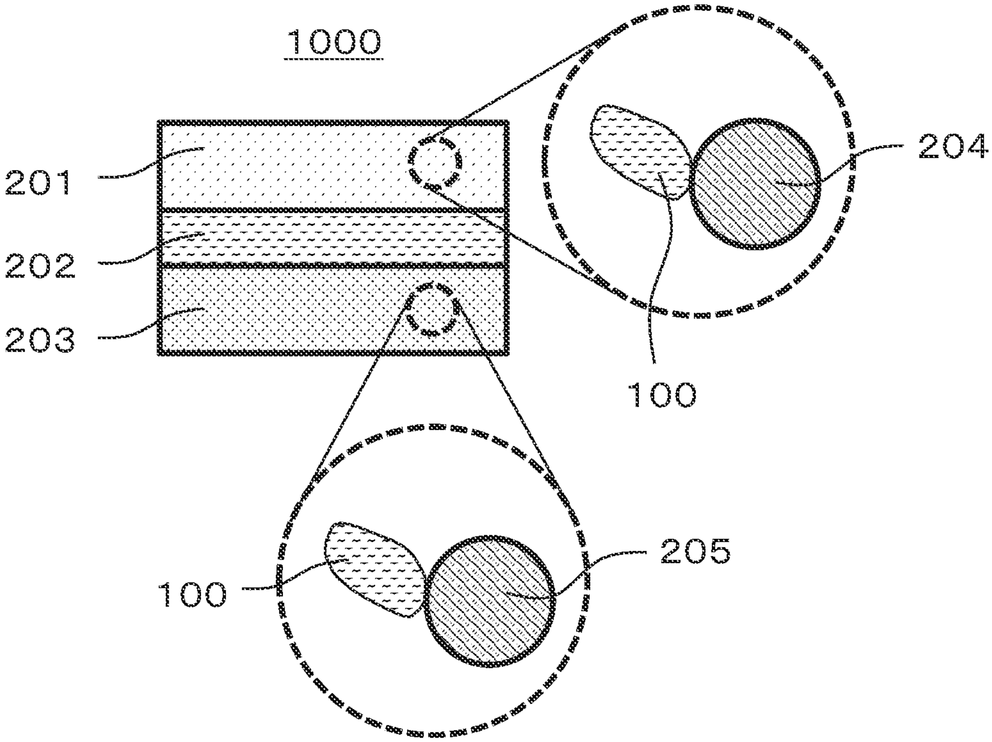
FIG. 1 shows a cross-sectional view of a battery 1000 according to a second embodiment.

Embodiments of the present disclosure will be described below with reference to the drawings. The present disclosure is not limited to the following embodiments.

First Embodiment

A solid electrolyte material according to a first embodiment is represented by the following composition formula (1), Formula (1)

$$Li_aAl_bO_cX_d$$

where values a, b, c, and d are each greater than 0, and X is at least one selected from the group consisting of CI and Br.

The solid electrolyte material according to the first embodiment can have, for example, practical lithium-ion conductivity, and can have, for example, high lithium-ion conductivity. Here, high lithium-ion conductivity is, for example, $1\times10^{-5}$ S/cm or more. In other words, the solid electrolyte material according to the first embodiment can have an ionic conductivity of, for example, $1\times10^{-5}$ S/cm or more.

The solid electrolyte material according to the first embodiment can be used to achieve a battery having excellent charge and discharge characteristics. An example of the battery is an all-solid-state battery. The all-solid-state battery may be a primary battery or a secondary battery.

It is desirable that the solid electrolyte material according to the first embodiment should be substantially free of sulfur. The phrase "the solid electrolyte material according to the first embodiment is substantially free of sulfur" means that the solid electrolyte material does not contain sulfur as a constituent element except sulfur inevitably introduced as impurities. In this case, sulfur introduced as impurities into the solid electrolyte material has an amount of, for example, 1 mol % or less. It is further desirable that the solid electrolyte material according to the first embodiment should be free of sulfur. Solid electrolyte materials free of sulfur generate no hydrogen sulfide when exposed to the atmosphere, and accordingly are excellent in safety. The sulfide solid electrolyte disclosed in JP 2011-129312 A might generate hydrogen sulfide when exposed to the atmosphere.

In Formula (1), when b=1, a may satisfy a mathematical relation $0<a\leq3$, and may satisfy a mathematical relation $0.05\leq a\leq1.5$. When b=1, a may satisfy a mathematical relation $0.1\leq a\leq1.3$, may satisfy a mathematical relation $0.1\leq a\leq1.0$, and may satisfy a mathematical relation $0.2\leq a\leq1.0$.

In Formula (1), when b=1, c may satisfy a mathematical relation $0<c\leq3$, and may satisfy a mathematical relation $0.14<c\leq1.7$. When b=1, c may satisfy a mathematical relation $0.4\leq c\leq1.3$, and may satisfy a mathematical relation $0.5\leq c\leq1.25$.

In Formula (1), when b=1, d may satisfy a mathematical relation $0<d\leq6$, and may satisfy a mathematical relation $0.76<d\leq4.1$. When b=1, d may satisfy a mathematical relation $0.9\leq d\leq3.0$, and may satisfy a mathematical relation $1.0\leq d\leq2.5$.

To increase the ionic conductivity of a solid electrolyte material, X in the solid electrolyte material according to the first embodiment may include Cl. Desirably, X may be Cl.

An X-ray diffraction pattern of the solid electrolyte material according to the first embodiment can be measured by the θ-2θ method using Cu-Kα rays (wavelengths of 1.5405 Å and 1.5444 Å) as X-ray sources.

The solid electrolyte material according to the first embodiment may include a first crystalline phase. In an X-ray diffraction pattern of the first crystalline phase, a peak is present within each of ranges of a diffraction angle 2θ from 28° to 32°, from 33° to 37°, and from 48° to 52°. A solid electrolyte material including the first crystalline phase has high ionic conductivity.

The peaks, which are present within the above ranges of the diffraction angle 2θ in the X-ray diffraction pattern of the first crystalline phase, may have a broad shape. In other words, in the case where appearance of the peaks within the above respective ranges of the diffraction angle 2θ in the X-ray diffraction pattern is observed, the peaks are recognized to be present within the above respective ranges of the diffraction angle 2θ. In X-ray diffraction patterns of a second crystalline phase and a third crystalline phase, which will be described later, peaks present within respective ranges of the diffraction angle may have a broad shape likewise.

The solid electrolyte material according to the first embodiment may include the second crystalline phase. In the X-ray diffraction pattern of the second crystalline phase, at least one peak is present within a range of the diffraction angle 2θ from 26° to less than 28.5°, and at least three peaks are present within a range of the diffraction angle 2θ from 28.5° to 33°. A solid electrolyte material including the second crystalline phase has high ionic conductivity.

In the X-ray diffraction pattern of the second crystalline phase, furthermore, at least one peak may be present within a range of the diffraction angle 2θ from 47° to 50°, and at least two peaks may be present within a range of the diffraction angle 2θ from 17° to 21°. A solid electrolyte material including such a crystalline phase has high ionic conductivity.

The solid electrolyte material according to the first embodiment may include the third crystalline phase. In the X-ray diffraction pattern of the third crystalline phase, at least one peak is present within each of ranges of the diffraction angle 2θ from 11.5° to 14°, from 14.5° to 17°, from 23° to 25.5°, and from 29.5° to 33°, and at least two peaks are present within a range of the diffraction angle 2θ from 19.5° to 23°. Solid electrolyte materials including the third crystalline phase have high ionic conductivity.

To increase the ionic conductivity of the solid electrolyte material, the solid electrolyte material according to the first embodiment may include at least two selected from the group consisting of the first crystalline phase, the second crystalline phase, and the third crystalline phase.

The solid electrolyte material according to the first embodiment may further include a crystalline phase having a crystal structure different from those of the first crystalline phase, the second crystalline phase, and the third crystalline phase.

To increase the ionic conductivity of the solid electrolyte material, a mathematical relation $b/(a+b)>0.4$ may be satisfied in Formula (1). This prevents the amount of lithium contained in the crystals from being excessive, thereby facilitating formation of a solid solution of lithium in the crystals. In other words, a stable crystal structure is achieved.

To increase the ionic conductivity of the solid electrolyte material, $b/(a+b)<0.95$ may be satisfied in Formula (1). This allows a sufficient amount of lithium ions to be present in the crystals, thereby facilitating conduction of lithium ions.

To increase the ionic conductivity of the solid electrolyte material, $0.438\leq b/(a+b)\leq 0.906$ may be satisfied in Formula (1).

To increase the ionic conductivity of the solid electrolyte material, $d/(c+d)>0.4$ may be satisfied in Formula (1). This prevents the amount of oxygen contained in the crystals from being excessive, thereby enabling to suppress inhibition of lithium ion conduction by oxygen which is a divalent anion.

To increase the ionic conductivity of the solid electrolyte material, $d/(c+d)<0.95$ may be satisfied in Formula (1). This allows a sufficient amount of oxygen to be present in the crystals, thereby enabling to achieve a stable crystal structure by high binding properties of oxygen.

To increase the ionic conductivity of the solid electrolyte material, $0.45\leq d/(c+d)\leq 0.833$ may be satisfied in Formula (1).

The shape of the solid electrolyte material according to the first embodiment is not limited. The shape is, for example, acicular, spherical, or ellipsoidal. The solid electrolyte material according to the first embodiment may be in particle form. The solid electrolyte material according to the first embodiment may be formed in the shape of a pellet or a plate.

In the case where the shape of the solid electrolyte material according to the first embodiment is, for example, in particle form (e.g., spherical), the solid electrolyte material may have a median diameter of 0.1 μm or more and 100 μm or less, and desirably may have a median diameter of 0.5 μm or more and 10 μm or less. Accordingly, the solid electrolyte material according to the first embodiment has higher ionic conductivity. Furthermore, in the case where the solid electrolyte material according to the first embodiment is mixed with another material such as an active material, a favorable dispersion state of the solid electrolyte material according to the first embodiment and the other material is achieved. The median diameter means the particle diameter at a cumulative volume equal to 50% in the volumetric particle size distribution. The volumetric particle size distribution is measured, for example, by a laser diffraction measurement device or an image analysis device.

<Method of Manufacturing Solid Electrolyte Material>

The solid electrolyte material according to the first embodiment is manufactured, for example, as follows.

Raw material powders are prepared and mixed together so as to obtain a target composition. Examples of the raw material powders may include a halide and an oxide.

In an example, in the case where the target composition is $LiAlOCl_2$, a LiCl raw material powder, an $AlCl_3$ raw material powder, and an $Al_2O_3$ raw material powder are mixed together at a molar ratio of 0.600:0.200:0.200. The raw material powders may be mixed together at a molar ratio adjusted in advance so as to cancel out a composition change which can occur in the synthesis process.

The raw material powders are reacted with each other mechanochemically (i.e., by a mechanochemical milling method) in a mixer such as a planetary ball mill to obtain a mixture.

By these methods, the solid electrolyte material according to the first embodiment can be obtained.

Second Embodiment

A second embodiment of the present disclosure will be described below. The matters described in the first embodiment will be omitted as appropriate.

A battery according to the second embodiment includes a positive electrode, an electrolyte layer, and a negative electrode. The electrolyte layer is disposed between the positive electrode and the negative electrode. At least one selected from the group consisting of the positive electrode, the electrolyte layer, and the negative electrode includes the solid electrolyte material according to the first embodiment. Owing to including the solid electrolyte material according to the first embodiment, the battery according to the second embodiment has high charge and discharge characteristics.

A specific example of the battery according to the second embodiment will be described below.

FIG. 1 shows a cross-sectional view of a battery 1000 according to the second embodiment.

The battery 1000 includes a positive electrode 201, an electrolyte layer 202, and a negative electrode 203.

The positive electrode 201 includes positive electrode active material particles 204 and solid electrolyte particles 100.

The electrolyte layer 202 is disposed between the positive electrode 201 and the negative electrode 203.

The electrolyte layer 202 includes an electrolyte material (e.g., a solid electrolyte material).

The negative electrode 203 includes negative electrode active material particles 205 and the solid electrolyte particles 100.

The solid electrolyte particles 100 are particles including the solid electrolyte material according to the first embodiment as the main component. The particles including the solid electrolyte material according to the first embodiment as the main component refer to particles in which the component present in the largest amount in molar ratio is the solid electrolyte material according to the first embodiment. The solid electrolyte particles 100 may be particles consisting of the solid electrolyte material according to the first embodiment.

The positive electrode 201 includes a material capable of occluding and releasing metal ions (e.g., lithium ions). The material is, for example, a positive electrode active material (e.g., the positive electrode active material particles 204).

Examples of the positive electrode active material include a lithium-containing transition metal oxide, a transition metal fluoride, a polyanion material, a fluorinated polyanion material, a transition metal sulfide, a transition metal oxyfluoride, a transition metal oxysulfide, and a transition metal oxynitride. Examples of the lithium-containing transition metal oxide include $Li(Ni, Co, Al)O_2$, $LiCoO_2$, and $Li(Ni, Co, Mn)O_2$. From the viewpoint of energy density of the battery, a preferred example of the positive electrode active material is $Li(Ni, Co, Mn)O_2$. $Li(Ni, Co, Mn)O_2$ can be charged and discharged at a potential of 4 v or more. In the present disclosure, an expression "(A, B, C)" represents "at least one selected from the group consisting of A, B, and C", where A, B, and C each represent an element.

The positive electrode active material particles 204 may have a median diameter of 0.1 μm or more and 100 μm or less. In the case where the positive electrode active material particles 204 have a median diameter of 0.1 μm or more, favorable dispersion of the positive electrode active material particles 204 and the solid electrolyte particles 100 is achieved in the positive electrode 201. This improves the charge and discharge characteristics of the battery. In the case where the positive electrode active material particles 204 have a median diameter of 100 μm or less, the diffusion rate of lithium in the positive electrode active material particles 204 improves. This enables the battery to operate at a high power.

The positive electrode active material particles 204 may have a median diameter larger than the solid electrolyte particles 100. This enables favorable dispersion of the positive electrode active material particles 204 and the solid electrolyte particles 100.

To increase the energy density and the power output of the battery, in the positive electrode 201, the ratio of the volume of the positive electrode active material particles 204 to the sum of the volume of the positive electrode active material particles 204 and the volume of the solid electrolyte particles 100 may be 0.30 or more and 0.95 or less.

To increase the energy density and the power output of the battery, the positive electrode 201 may have a thickness of 10 μm or more and 500 μm or less.

The electrolyte layer 202 includes an electrolyte material. The electrolyte material is, for example, a solid electrolyte material. The electrolyte layer 202 may be a solid electrolyte layer. The solid electrolyte material included in the electrolyte layer 202 may include the solid electrolyte material according to the first embodiment.

The electrolyte layer 202 may consist of the solid electrolyte material according to the first embodiment.

The electrolyte layer 202 may consist of a solid electrolyte material different from the solid electrolyte material according to the first embodiment. Examples of the solid electrolyte material different from the solid electrolyte material according to the first embodiment include $Li_2MgX'_4$, $Li_2FeX'_4$, $Li(Al, Ga, In)X'_4$, $Li_3(Al, Ga, In)X'_6$, and $LiX'$ where X' is at least one selected from the group consisting of F, Cl, Br, and I.

Hereinafter, the solid electrolyte material according to the first embodiment is referred to as first solid electrolyte material. The solid electrolyte material different from the solid electrolyte material according to the first embodiment is referred to as second solid electrolyte material.

The electrolyte layer 202 may include not only the first solid electrolyte material but also the second solid electrolyte material. The first solid electrolyte material and the second solid electrolyte material may be homogenously dispersed.

A layer formed of the first solid electrolyte material and a layer formed of the second solid electrolyte material may be stacked along the stacking direction of the battery 1000.

The electrolyte layer 202 may have a thickness of 1 μm or more and 100 μm or less. In the case where the electrolyte layer 202 has a thickness of 1 μm or more, a short-circuit between the positive electrode 201 and the negative electrode 203 is less likely to occur. In the case where the electrolyte layer 202 has a thickness of 100 μm or less, the battery can operate at a high power.

The negative electrode 203 includes a material capable of occluding and releasing metal ions (e.g., lithium ions). The material is, for example, a negative electrode active material (e.g., the negative electrode active material particles 205).

Examples of the negative electrode active material include a metal material, a carbon material, an oxide, a nitride, a tin compound, and a silicon compound. The metal material may be an elemental metal material or an alloy. Examples of the metal material include lithium metal and a lithium alloy. Examples of the carbon material include natural graphite, coke, semi-graphitized carbon, a carbon fiber, spherical carbon, artificial graphite, and amorphous carbon. From the viewpoint of capacity density, preferred examples of the negative electrode active material include silicon (i.e., Si), tin (i.e., Sn), a silicon compound, and a tin compound. By using an active material having a low average discharge voltage, such as graphite, as the negative electrode active material, the energy density of the battery can be improved.

The negative electrode active material particles 205 may have a median diameter of 0.1 μm or more and 100 μm or less. In the case where the negative electrode active material particles 205 have a median diameter of 0.1 μm or more, a favorable dispersion state of the negative electrode active material particles 205 and the solid electrolyte particles 100 is achieved in the negative electrode 203. This improves the charge and discharge characteristics of the battery. In the case where the negative electrode active material particles

205 have a median diameter of 100 μm or less, the diffusion rate of lithium in the negative electrode active material particles 205 improves. This enables the battery to operate at a high power.

The negative electrode active material particles 205 may have a median diameter larger than the solid electrolyte particles 100. This achieves a favorable dispersion state of the negative electrode active material particles 205 and the solid electrolyte particles 100 in the negative electrode 203.

To increase the energy density and the power output of the battery, in the negative electrode 203, the ratio of the volume of the negative electrode active material particles 205 to the sum of the volume of the negative electrode active material particles 205 and the volume of the solid electrolyte particles 100 may be 0.30 or more and 0.95 or less.

To increase the energy density and the power output of the battery, the negative electrode 203 may have a thickness of 10 μm or more and 500 μm or less.

To increase the ionic conductivity, the chemical stability, and the electrochemical stability, at least one selected from the group consisting of the positive electrode 201, the electrolyte layer 202, and the negative electrode 203 may include the second solid electrolyte material. Examples of the second solid electrolyte material include a sulfide solid electrolyte, an oxide solid electrolyte, a halide solid electrolyte, and an organic polymer solid electrolyte.

Examples of the sulfide solid electrolyte include $Li_2S—P_2S_5$, $Li_2S—SiS_2$, $Li_2S—B_2S_3$, $Li_2S—GeS_2$, $Li_{3.25}Ge_{0.25}P_{0.75}S_4$, and $Li_{10}GeP_2S_{12}$.

Examples of the oxide solid electrolyte include:

(i) a NASICON solid electrolyte such as $LiTi_2(PO_4)_3$ and element-substituted substances thereof;

(ii) a perovskite solid electrolyte such as $(LaLi)TiO_3$;

(iii) a LISICON solid electrolyte such as $Li_{14}ZnGe_4O_{16}$, $Li_4SiO_4$, and $LiGeO_4$ and element-substituted substances thereof;

(iv) a garnet solid electrolyte such as $Li_7La_3Zr_2O_{12}$ and element-substituted substances thereof; and (v) $Li_3PO_4$ and N-substituted substances thereof.

Examples of the halide solid electrolyte include $Li_2MgX'_4$, $Li_2FeX'_4$, $Li(Al, Ga, In)X'_4$, $Li_3(Al, Ga, In)X'_6$, and LiX', as described above.

Another example of the halide solid electrolyte is a compound represented by $Li_pMe_qY_rZ_6$ where $p+m'q+3r=6$ and $r>0$ are satisfied. Me is at least one element selected from the group consisting of metalloid elements and metal elements other than Li and Y. The value m' represents the valence of Me. Z is at least one selected from the group consisting of F, Cl, Br, and I. The “metalloid elements” are B, Si, Ge, As, Sb, and Te. The “metal elements” are: all the elements included in Groups 1 to 12 of the periodic table (excluding hydrogen); and all the elements included in Groups 13 to 16 of the periodic table (excluding B, Si, Ge, As, Sb, Te, C, N, P, O, S, and Se). To increase the ionic conductivity of the halide solid electrolyte, Me may be at least one selected from the group consisting of Mg, Ca, Sr, Ba, Zn, Sc, Al, Ga, Bi, Zr, Hf, Ti, Sn, Ta, and Nb.

An example of the organic polymer solid electrolyte is a compound of a polymer compound and a lithium salt.

The polymer compound may have an ethylene oxide structure. A polymer compound having an ethylene oxide structure can contain a large amount of a lithium salt, and accordingly can increase the ionic conductivity.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used.

To facilitate transfer of lithium ions and thereby improve the output characteristics of the battery, at least one selected from the group consisting of the positive electrode 201, the electrolyte layer 202, and the negative electrode 203 may include a nonaqueous electrolyte solution, a gel electrolyte, or an ionic liquid.

The nonaqueous electrolyte solution contains a nonaqueous solvent and a lithium salt dissolved in the nonaqueous solvent.

Examples of the nonaqueous solvent include a cyclic carbonate solvent, a linear carbonate solvent, a cyclic ether solvent, a linear ether solvent, a cyclic ester solvent, a linear ester solvent, and a fluorinated solvent. Examples of the cyclic carbonate solvent include ethylene carbonate, propylene carbonate, and butylene carbonate. Examples of the linear carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the linear ether solvent include 1,2-dimethoxyethane and 1,2-diethoxyethane. Examples of the cyclic ester solvent include γ-butyrolactone. Examples of the linear ester solvent include methyl acetate. Examples of the fluorinated solvent include fluoroethylene carbonate, methyl fluoropropionate, fluorobenzene, fluoroethyl methyl carbonate, and fluorodimethylene carbonate. One nonaqueous solvent selected from these may be used alone. Alternatively, a mixture of two or more nonaqueous solvents selected from these may be used.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_6)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used.

The concentration of the lithium salt may be, for example, 0.5 mol/L or more and 2 mol/L or less.

As the gel electrolyte, a polymer material impregnated with a nonaqueous electrolyte solution can be used. Examples of the polymer material include polyethylene oxide, polyacrylonitrile, polyvinylidene fluoride, polymethyl methacrylate, and a polymer having an ethylene oxide bond.

Examples of cations contained in the ionic liquid include:

(i) aliphatic linear quaternary salts such as tetraalkylammoniums and tetraalkylphosphoniums;

(ii) aliphatic cyclic ammoniums such as pyrrolidiniums, morpholiniums, imidazoliniums, tetrahydropyrimidiniums, piperaziniums, and piperidiniums; and (iii) nitrogen-containing heterocyclic aromatic cations such as pyridiniums and imidazoliums.

Examples of anions contained in the ionic liquid include $PF_6—$, $BF_4—$, $SbF_6—$, $AsF_6—$, $SO_3CF_3—$, $N(SO_2CF_3)_2—$, $N(SO_2C_2N_2—$, $N(SO_2CF_3)(SO_2C_4F_9)—$, and $C(SO_2CF_3)_3—$.

The ionic liquid may contain a lithium salt.

To increase the adhesion between particles, at least one selected from the group consisting of the positive electrode 201, the electrolyte layer 202, and the negative electrode 203 may contain a binder.

Examples of the binder include polyvinylidene fluoride, polytetrafluoroethylene, polyethylene, polypropylene, aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene-butadiene rubber, and carboxymethylcellulose. A copolymer can also be used as the binder. Examples of such a binder include a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the above materials may be used as the binder.

To increase the electronic conductivity, at least one selected from the group consisting of the positive electrode 201 and the negative electrode 203 may contain a conductive additive.

Examples of the conductive additive include:

(i) graphites such as natural graphite and artificial graphite;

(ii) carbon blacks such as acetylene black and ketjen black;

(iii) conductive fibers such as a carbon fiber and metal fiber;

(iv) fluorinated carbon;

(v) metal powders such as an aluminum powder;

(vi) conductive whiskers such as a zinc oxide whisker and a potassium titanate whisker;

(vii) a conductive metal oxide such as titanium oxide; and (viii) a conductive polymer compound such as polyaniline compound, polypyrrole compound, and polythiophene compound. To reduce the cost, the conductive additive in (i) or (ii) above may be used.

Examples of the shape of the battery according to the second embodiment include a coin type, a cylindrical type, a prismatic type, a sheet type, a button type, a flat type, and a stack type.

The battery according to the second embodiment may be manufactured, for example, by preparing a material for forming a positive electrode, a material for forming an electrolyte layer, and a material for forming a negative electrode, and producing by a known method a stack in which the positive electrode, the electrolyte layer, and the negative electrode are disposed in this order.

EXAMPLES

The present disclosure will be described below in more detail with reference to examples and comparative examples.

Example 1

[Production of Solid Electrolyte Material]

In an argon atmosphere with a dew point of −60° C. or less (hereinafter referred to as “dry argon atmosphere”), LiCl, $AlCl_3$, and $Al_2O_3$ were prepared as raw material powders at a molar ratio of 0.429:0.214:0.357. These raw material powders were mixed and subjected to a milling process with a planetary ball mill at 500 rpm for 12 hours. Thus, a powder of a solid electrolyte material according to Example 1 was obtained. The solid electrolyte material according to Example 1 had a composition represented by $Li_{0.462}AlO_{1.15}Cl_{1.15}$.

[Crystal Structure Analysis]

Figure 2:
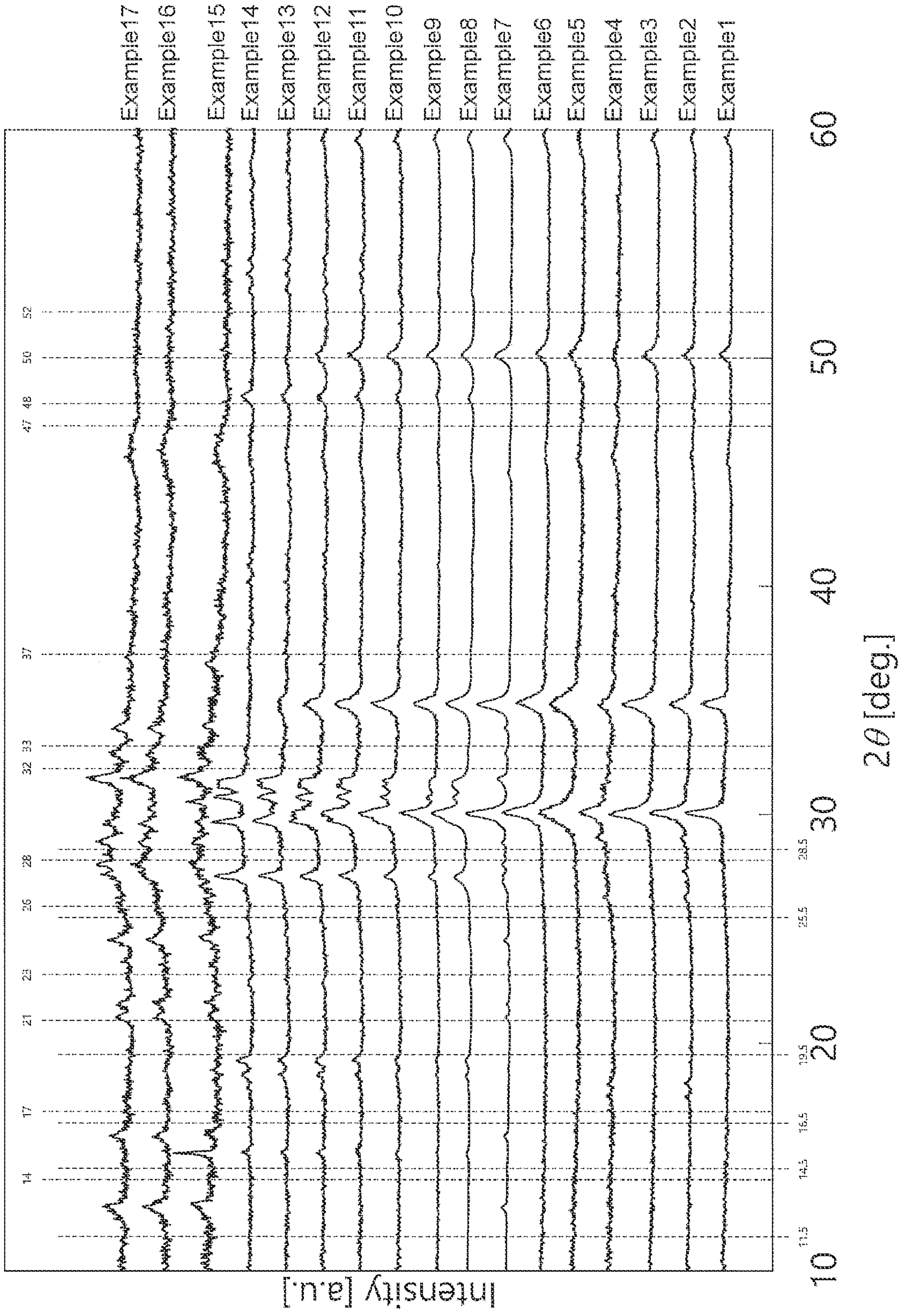
FIG. 2 is a graph showing X-ray diffraction patterns of solid electrolyte materials according to Examples 1 to 17.

FIG. 2 is a graph showing an X-ray diffraction pattern of the solid electrolyte material according to Example 1.

In a dry atmosphere with a dew point of −30° C. or less, the X-ray diffraction pattern of the solid electrolyte material according to Example 1 was measured with an X-ray diffractometer (MiniFlex 600 available from Rigaku Corporation). X-ray sources used were Cu-Kα rays.

In the X-ray diffraction pattern of the solid electrolyte material according to Example 1, peaks were present at diffraction angles 2θ of 30.10°, 34.84°, and 50.19°.

[Ionic Conductivity Measurement]

Figure 3:
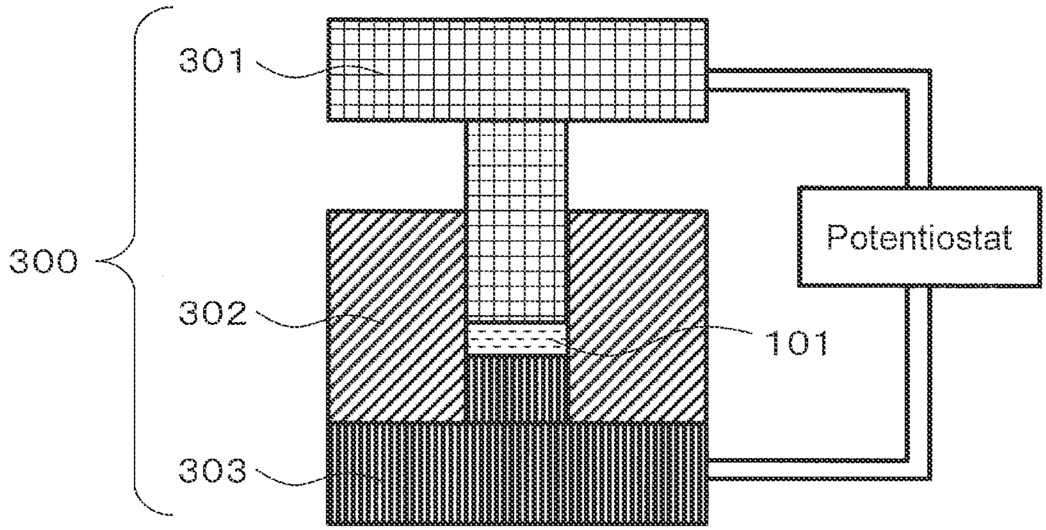
FIG. 3 shows a schematic view of a pressure-molding die 300 used to evaluate the ionic conductivity of solid electrolyte materials.

FIG. 3 shows a schematic view of a pressure-molding die 300 used to evaluate the ionic conductivity of solid electrolyte materials.

The pressure-molding die 300 included an upper punch 301, a die 302, and a lower punch 303. The die 302 was formed of insulating polycarbonate. The upper punch 301 and the lower punch 303 were formed of electronically conductive stainless steel.

The pressure-molding die 300 shown in FIG. 3 was used to measure the ionic conductivity of the solid electrolyte material according to Example 1 by the following method.

In a dry argon atmosphere, the powder of the solid electrolyte material according to Example 1 (i.e., a solid electrolyte material powder 101 in FIG. 3) was charged into the pressure-molding die 300. Inside the pressure-molding die 300, a pressure of 360 MPa was applied to the powder of the solid electrolyte material according to Example 1 with the upper punch 301 and the lower punch 303.

While the pressure was being applied, the upper punch 301 and the lower punch 303 were connected to a potentiostat (VSP-300 available from Bio-Logic SAS) equipped with a frequency response analyzer. The upper punch 301 was connected to a working electrode and a potential measurement terminal. The lower punch 303 was connected to a counter electrode and a reference electrode. The ionic conductivity of the solid electrolyte material was measured at room temperature by an electrochemical impedance measurement method.

Figure 4:
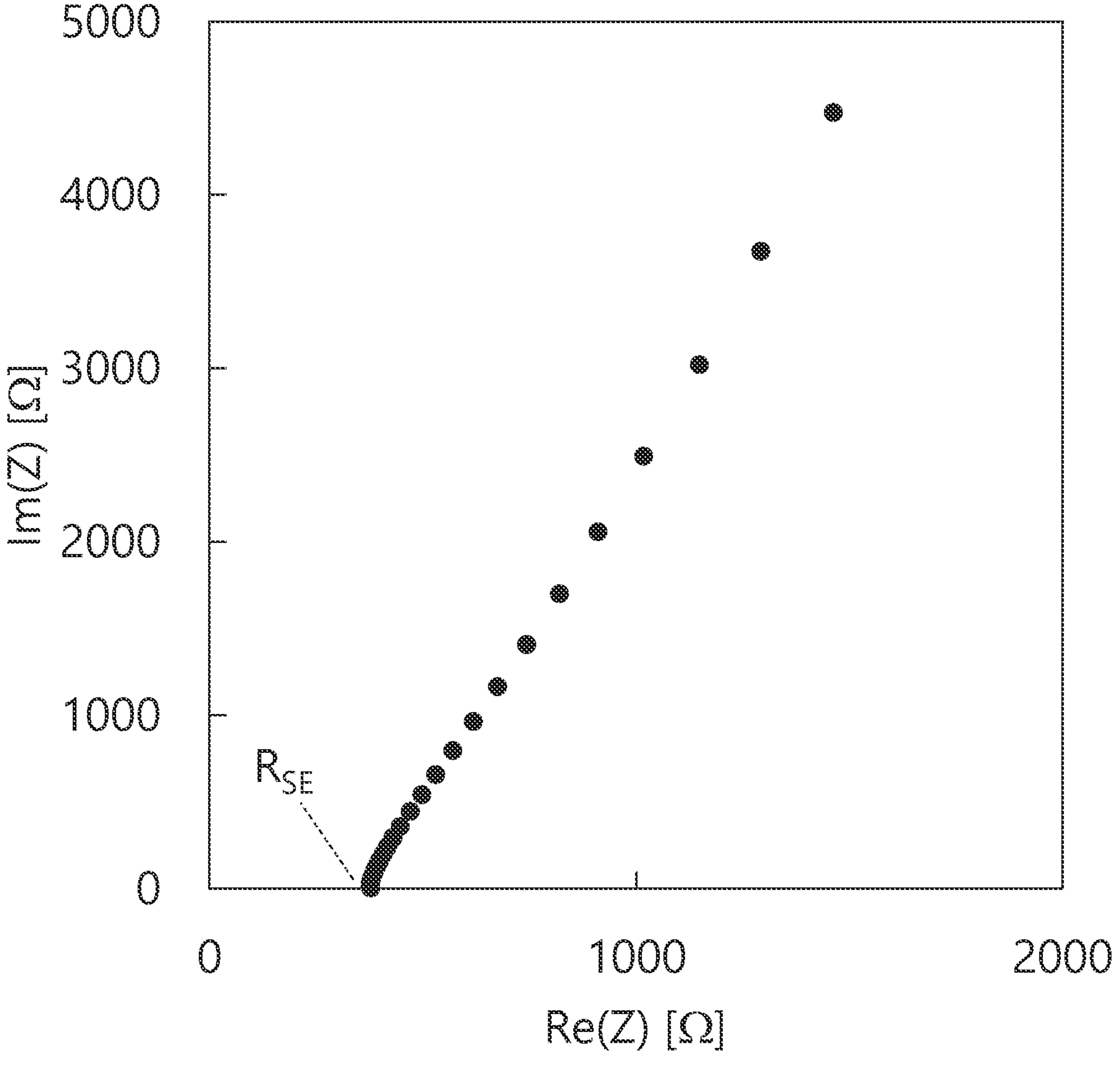
FIG. 4 is a graph showing a Cole-Cole plot obtained by impedance measurement for the solid electrolyte material according to Example 1.

FIG. 4 is a graph showing a Cole-Cole plot obtained by impedance measurement for the solid electrolyte material according to Example 1.

In FIG. 4, the real part of the complex impedance at the measurement point where the absolute value of the phase of the complex impedance was smallest was assumed to be the resistance value of the solid electrolyte material to ion conduction. For the real part, see an arrow $R_{SE}$ shown in FIG. 4. The resistance value was used to calculate the ionic conductivity based on the following mathematical formula (2)

$$\sigma = (R_{SE} \times S/t)^{-1}, \quad (2)$$

where σ represents the ionic conductivity. The symbol S represents the contact area of the solid electrolyte material with the upper punch 301. In other words, the contact area S is equal to the cross-sectional area of the cavity of the die 302 in FIG. 3. The symbol $R_{SE}$ represents the resistance value of the solid electrolyte material in the impedance measurement. The symbol t represents the thickness of the solid electrolyte material to which the pressure had been applied. In other words, the thickness t is equal to the thickness of a layer formed of the solid electrolyte material powder 101 in FIG. 3.

The ionic conductivity of the solid electrolyte material according to Example 1 measured at 25° C. was $1.94 \times 10^{-4}$ S/cm.

[Production of Battery]

In a dry argon atmosphere, the solid electrolyte material according to Example 1 and Li(Ni, Co, Mn)$O_2$ (hereinafter referred to as "NCM"), which is a positive electrode active material, were prepared at a mass ratio of 24:76. These materials were mixed together in an agate mortar to obtain a positive electrode mixture according to Example 1.

In an insulating cylinder having an inner diameter of 9.5 mm, sulfide solid electrolyte $Li_2S$—$P_2S_5$ (hereinafter referred to as "LPS") (60 mg) and the solid electrolyte material according to Example 1 (24 mg) were stacked in this order. Thus, a stack was obtained. A pressure of 160 MPa was applied to this stack to form a solid electrolyte layer.

Next, the positive electrode mixture (9.2 mg) according to Example 1 was stacked on the solid electrolyte layer formed of the solid electrolyte material according to Example 1. Thus, a stack was obtained. A pressure of 360 MPa was applied to this stack to form a positive electrode.

Next, a metal In foil (thickness of 200 μm), a metal Li foil (thickness of 300 μm), and a metal In foil (thickness of 200 μm) were stacked in this order on a solid electrolyte layer formed of LPS. Thus, a stack was obtained. A pressure of 80 MPa was applied to this stack to form a negative electrode.

Stainless steel current collectors were disposed on the positive electrode and the negative electrode, and current collector leads were attached to the current collectors.

Finally, an insulating ferrule was used to block the inside of the insulating cylinder from the outside air atmosphere and seal the cylinder. Thus, a battery according to Example 1 was obtained.

[Charge and Discharge Measurement]

Figure 5:
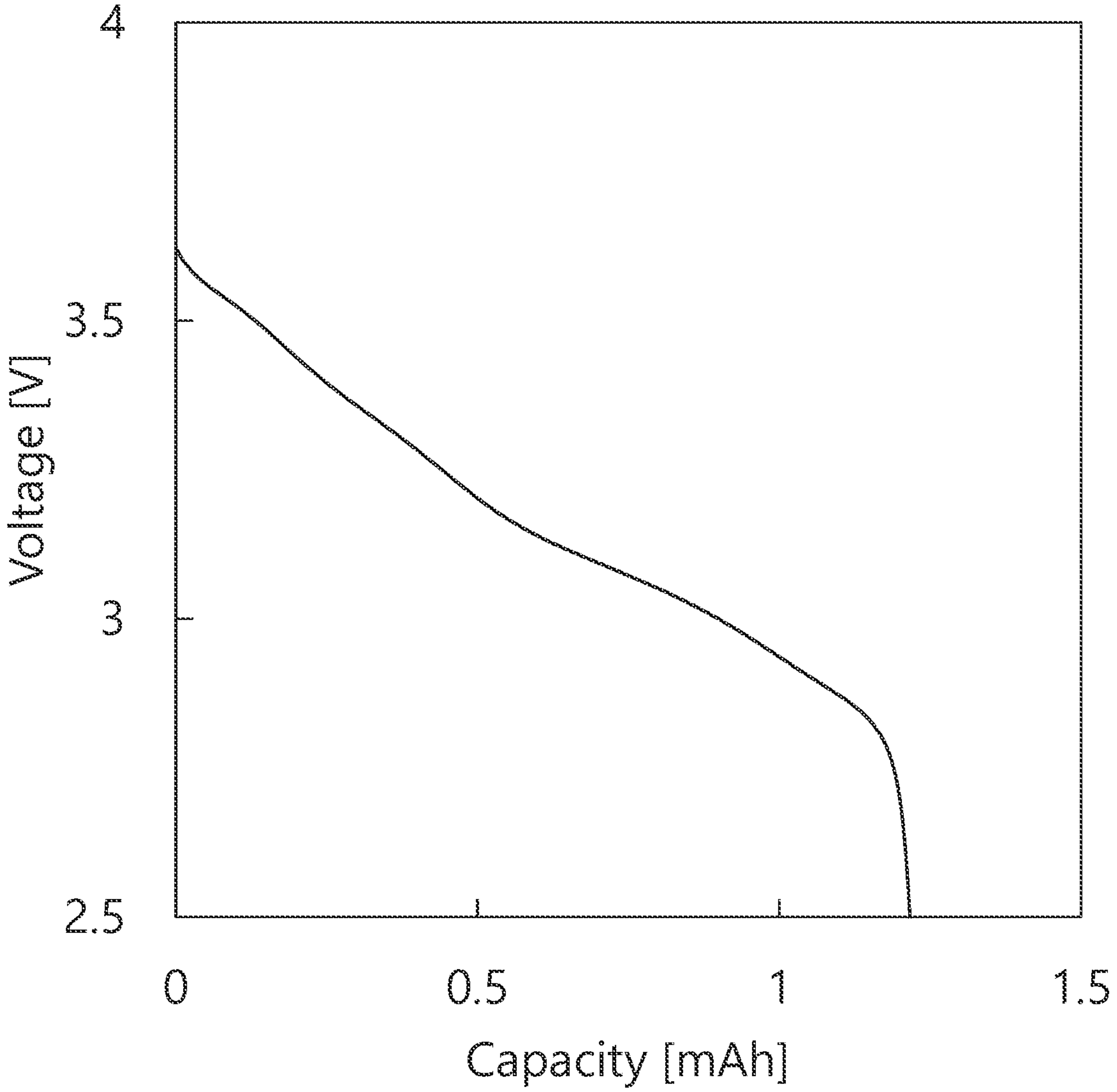
FIG. 5 is a graph showing the initial discharge characteristics of a battery according to Example 1.

FIG. 5 is a graph showing the initial discharge characteristics of the battery according to Example 1.

The battery according to Example 1 was placed in a thermostatic chamber at 25° C.

The battery according to Example 1 was charged at a current density of 98.8 $\mu A/cm^2$ until the positive electrode reached a voltage of 3.68 V relative to the negative electrode. The current density corresponds to 0.05 C rate (20-hour rate) with respect to the theoretical capacity of the battery. Charge refers to a state where an electric current flows in a direction in which lithium ions migrate from the positive electrode mixture including NCM to the In—Li alloy (i.e., the negative electrode).

Next, the battery according to Example 1 was discharged at a current density of 98.8 $\mu A/cm^2$ until the positive electrode reached a voltage of 1.88 V relative to the negative electrode. The current density corresponds to 0.05 C rate (20-hour rate) with respect to the theoretical capacity of the battery. Discharge refers to a state where an electric current flows in a direction in which Li lithium ions migrate from the In—Li alloy (i.e., the negative electrode) to the positive electrode mixture including NCM.

As a result of the charge and discharge measurement, the battery according to Example 1 had an initial discharge capacity of 1.24 mAh.

Examples 2 to 33 and Comparative Examples 1 to 4

[Production of Solid Electrolyte Material]

In Example 2, LiCl, $AlCl_3$, and $Al_2O_3$ were prepared as raw material powders at a molar ratio of 0.471:0.243:0.286.

In Example 3, LiCl, $AlCl_3$, and $Al_2O_3$ were prepared as raw material powders at a molar ratio of 0.553:0.184:0.263.

In Example 4, LiCl, $AlCl_3$, and $Al_2O_3$ were prepared as raw material powders at a molar ratio of 0.346:0.269:0.385.

In Example 5, LiCl, $AlCl_3$, and $Al_2O_3$ were prepared as raw material powders at a molar ratio of 0.563:0.125:0.313.

In Example 6, LiCl, $AlCl_3$, and $Al_2O_3$ were prepared as raw material powders at a molar ratio of 0.500:0.167:0.333.

In Example 7, LiCl, $AlCl_3$, and $Al_2O_3$ were prepared as raw material powders at a molar ratio of 0.600, 0.200, and 0.200.

In Example 8, LiCl, $AlCl_3$, and $Al_2O_3$ were prepared as raw material powders at a molar ratio of 0.522:0.261:0.217.

In Example 9, LiCl, $AlCl_3$, and $Al_2O_3$ were prepared as raw material powders at a molar ratio of 0.545:0.227:0.227.

In Example 10, LiCl, $AlCl_3$, and $Al_2O_3$ were prepared as raw material powders at a molar ratio of 0.512:0.244:0.244.

In Example 11, LiCl, $AlCl_3$, and $Al_2O_3$ were prepared as raw material powders at a molar ratio of 0.474:0.263:0.263.

In Example 12, LiCl, $AlCl_3$, and $Al_2O_3$ were prepared as raw material powders at a molar ratio of 0.429:0.286:0.286.

In Example 13, LiCl, $AlCl_3$, and $Al_2O_3$ were prepared as raw material powders at a molar ratio of 0.375:0.313:0.313.

In Example 14, LiCl, $AlCl_3$, and $Al_2O_3$ were prepared as raw material powders at a molar ratio of 0.310:0.345:0.345.

In Example 15, LiCl, $AlCl_3$, and $Al_2O_3$ were prepared as raw material powders at a molar ratio of 0.136:0.409:0.455.

In Example 16, LiCl, $AlCl_3$, and $Al_2O_3$ were prepared as raw material powders at a molar ratio of 0.231:0.385:0.385.

In Example 17, LiCl, $AlCl_3$, and $Al_2O_3$ were prepared as raw material powders at a molar ratio of 0.250:0.333:0.417.

In Example 18, LiCl, $AlCl_3$, and $Al_2O_3$ were prepared as raw material powders at a molar ratio of 0.667:0.148:0.185.

In Example 19, LiCl, $AlCl_3$, and $Al_2O_3$ were prepared as raw material powders at a molar ratio of 0.429:0.333:0.238.

In Example 20, LiCl, $AlCl_3$, and $Al_2O_3$ were prepared as raw material powders at a molar ratio of 0.176:0.529:0.294.

In Example 21, LiCl, $AlCl_3$, and $Al_2O_3$ were prepared as raw material powders at a molar ratio of 0.588:0.235:0.176.

In Example 22, LiCl, $AlCl_3$, and $Al_2O_3$ were prepared as raw material powders at a molar ratio of 0.577:0.269:0.154.

In Example 23, LiCl, $AlCl_3$, and $Al_2O_3$ were prepared as raw material powders at a molar ratio of 0.612:0.163:0.224.

In Example 24, LiCl, $AlCl_3$, and $Al_2O_3$ were prepared as raw material powders at a molar ratio of 0.625:0.125:0.250.

In Example 25, LiCl, $AlCl_3$, and $Al_2O_3$ were prepared as raw material powders at a molar ratio of 0.375:0.500:0.125.

In Example 26, LiCl, $AlCl_3$, and $Al_2O_3$ were prepared as raw material powders at a molar ratio of 0.355:0.225:0.420.

In Example 27, LiCl, $AlCl_3$, and $Al_2O_3$ were prepared as raw material powders at a molar ratio of 0.266:0.405:0.329.

In Example 28, LiCl, LiBr, $AlCl_3$, and $Al_2O_3$ were prepared as raw material powders at a molar ratio of 0.480:0.120:0.200:0.200.

In Example 29, LiCl, LiBr, $AlCl_3$, and $Al_2O_3$ were prepared as raw material powders at a molar ratio of 0.360:0.240:0.200:0.200.

In Example 30, LiCl, LiBr, $AlCl_3$, and $Al_2O_3$ were prepared as raw material powders at a molar ratio of 0.240:0.360:0.200:0.200.

In Example 31, LiCl, LiBr, $AlCl_3$, and $Al_2O_3$ were prepared as raw material powders at a molar ratio of 0.120:0.480:0.200:0.200.

In Example 32, LiBr, $AlCl_3$, and $Al_2O_3$ were prepared as raw material powders at a molar ratio of 0.600:0.200:0.200.

In Example 33, LiBr, $AlBr_3$, and $Al_2O_3$ were prepared as raw material powders at a molar ratio of 0.600:0.200:0.200.

In Comparative Example 1, $Li_2O$ and $Al_2O_3$ were prepared as raw material powders at a molar ratio of 0.500:0.500.

In Comparative Example 2, LiCl and $Li_2O$ were prepared as raw material powders at a molar ratio of 0.500:0.500.

In Comparative Example 3, $AlCl_3$ and $Al_2O_3$ were prepared as raw material powders at a molar ratio of 0.500:0.500.

Solid electrolyte materials according to Examples 2 to 33 and Comparative Examples 1 to 3 were obtained in the same manner as in Example 1 except for the matters described above.

In Comparative Example 4, LiCl and $AlCl_3$ were prepared as raw material powders at a molar ratio of 0.500:0.500. These raw material powders were mixed and subjected to a milling process with a planetary ball mill at 500 rpm for 15 hours. Thus, a solid electrolyte material according to Comparative Example 4 was obtained.

[Ionic Conductivity Evaluation]

The ionic conductivity was measured for the solid electrolyte materials according to Examples 2 to 33 and Comparative Examples 1 to 4 in the same manner as in Example 1. The ionic conductivity of the solid electrolyte material according to Examples 2 to 33 is shown in Table 1. The ionic conductivity of the solid electrolyte material according to Comparative Examples 1 to 4 is shown in Table 2.

[Crystal Structure Analysis]

The X-ray diffraction pattern was measured for the solid electrolyte materials according to Examples 2 to 17 in the same manner as in Example 1. FIG. 2 is a graph showing the X-ray diffraction patterns of the solid electrolyte materials according to Examples 2 to 17. The angles of observed peaks are shown in Table 3.

In the X-ray diffraction patterns of the solid electrolyte materials according to Examples 2 to 12, a peak was present within each of ranges of the diffraction angle 2θ from 28° to 32°, from 33° to 37°, and from 48° to 52°.

In the X-ray diffraction patterns of the solid electrolyte materials according to Examples 11 to 14, at least one peak was present within each of ranges of the diffraction angle 2θ from 26° to less than 28.5° and from 47° to 50°. At least two peaks were present within a range of the diffraction angle 2θ from 17° to 21°. At least three peaks were present within a range of the diffraction angle 2θ from 28.5° to 33°.

In the X-ray diffraction patterns of the solid electrolyte materials according to Examples 7 and 15 to 17, at least one peak was present within each of ranges of the diffraction angle 2θ from 11.5° to 14°, from 14.5° to 17°, from 23° to 25.5°, and from 29.5° to 33°. At least two peaks were present within a range of the diffraction angle 2θ from 19.5° to 23°.

TABLE 1

| | Element ratio | | | | | | | Ionic |
|---|---|---|---|---|---|---|---|---|
| | Li a | Al b | O c | Cl | Br d | b/(a + b) | d/(c + d) | conductivity (S/cm) |
| Example 1 | 0.462 | 1.00 | 1.15 | 1.15 | 0 | 0.684 | 0.500 | $1.94 \times 10^{-4}$ |
| Example 2 | 0.579 | 1.00 | 1.05 | 1.47 | 0 | 0.633 | 0.583 | $2.17 \times 10^{-4}$ |
| Example 3 | 0.778 | 1.00 | 1.11 | 1.56 | 0 | 0.563 | 0.583 | $1.11 \times 10^{-4}$ |
| Example 4 | 0.333 | 1.00 | 1.11 | 1.11 | 0 | 0.750 | 0.500 | $3.01 \times 10^{-4}$ |
| Example 5 | 0.750 | 1.00 | 1.25 | 1.25 | 0 | 0.571 | 0.500 | $1.10 \times 10^{-5}$ |
| Example 6 | 0.600 | 1.00 | 1.20 | 1.20 | 0 | 0.625 | 0.500 | $3.71 \times 10^{-5}$ |
| Example 7 | 1.00 | 1.00 | 1.00 | 2.00 | 0 | 0.500 | 0.667 | $1.06 \times 10^{-4}$ |
| Example 8 | 0.750 | 1.00 | 0.938 | 1.88 | 0 | 0.571 | 0.667 | $1.11 \times 10^{-4}$ |
| Example 9 | 0.800 | 1.00 | 1.00 | 1.80 | 0 | 0.556 | 0.643 | $1.54 \times 10^{-4}$ |
| Example 10 | 0.700 | 1.00 | 1.00 | 1.70 | 0 | 0.588 | 0.630 | $1.51 \times 10^{-4}$ |
| Example 11 | 0.600 | 1.00 | 1.00 | 1.60 | 0 | 0.626 | 0.615 | $1.97 \times 10^{-4}$ |
| Example 12 | 0.500 | 1.00 | 1.00 | 1.50 | 0 | 0.667 | 0.600 | $1.82 \times 10^{-4}$ |
| Example 13 | 0.400 | 1.00 | 1.00 | 1.40 | 0 | 0.714 | 0.583 | $2.04 \times 10^{-4}$ |
| Example 14 | 0.300 | 1.00 | 1.00 | 1.30 | 0 | 0.769 | 0.565 | $2.05 \times 10^{-4}$ |
| Example 15 | 0.103 | 1.00 | 1.03 | 1.03 | 0 | 0.906 | 0.500 | $3.58 \times 10^{-5}$ |
| Example 16 | 0.200 | 1.00 | 1.00 | 1.20 | 0 | 0.833 | 0.545 | $1.27 \times 10^{-4}$ |
| Example 17 | 0.214 | 1.00 | 1.07 | 1.07 | 0 | 0.823 | 0.500 | $1.43 \times 10^{-4}$ |
| Example 18 | 1.29 | 1.00 | 1.07 | 2.14 | 0 | 0.438 | 0.667 | $7.83 \times 10^{-5}$ |
| Example 19 | 0.529 | 1.00 | 0.882 | 1.76 | 0 | 0.654 | 0.667 | $1.21 \times 10^{-4}$ |
| Example 20 | 0.158 | 1.00 | 0.789 | 1.58 | 0 | 0.864 | 0.667 | $2.09 \times 10^{-5}$ |
| Example 21 | 1.00 | 1.00 | 0.900 | 2.20 | 0 | 0.500 | 0.710 | $4.76 \times 10^{-5}$ |
| Example 22 | 1.00 | 1.00 | 0.800 | 2.40 | 0 | 0.500 | 0.750 | $6.18 \times 10^{-5}$ |
| Example 23 | 1.00 | 1.00 | 1.10 | 1.80 | 0 | 0.500 | 0.621 | $5.69 \times 10^{-5}$ |
| Example 24 | 1.00 | 1.00 | 1.20 | 1.60 | 0 | 0.500 | 0.571 | $1.35 \times 10^{-5}$ |
| Example 25 | 0.500 | 1.00 | 0.500 | 2.50 | 0 | 0.667 | 0.833 | $1.01 \times 10^{-5}$ |
| Example 26 | 0.333 | 1.00 | 1.18 | 0.968 | 0 | 0.750 | 0.450 | $9.22 \times 10^{-5}$ |
| Example 27 | 0.250 | 1.00 | 0.929 | 1.39 | 0 | 0.800 | 0.600 | $8.79 \times 10^{-5}$ |
| Example 28 | 1.00 | 1.00 | 1.00 | 1.80 | 0.200 | 0.500 | 0.667 | $1.21 \times 10^{-4}$ |
| Example 29 | 1.00 | 1.00 | 1.00 | 1.60 | 0.400 | 0.500 | 0.667 | $1.30 \times 10^{-4}$ |
| Example 30 | 1.00 | 1.00 | 1.00 | 1.40 | 0.600 | 0.500 | 0.667 | $1.25 \times 10^{-4}$ |
| Example 31 | 1.00 | 1.00 | 1.00 | 1.20 | 0.800 | 0.500 | 0.667 | $9.34 \times 10^{-5}$ |
| Example 32 | 1.00 | 1.00 | 1.00 | 1.00 | 1.00 | 0.500 | 0.667 | $1.11 \times 10^{-4}$ |
| Example 33 | 1.00 | 1.00 | 1.00 | 0 | 2.00 | 0.500 | 0.667 | $8.39 \times 10^{-5}$ |

TABLE 2

| | Element ratio | | | | | | | |
|---|---|---|---|---|---|---|---|---|
| | Li a | Al b | O c | Cl d | Br | b/(a + b) | d/(c + d) | Ionic conductivity (S/cm) |
| Comparative Example 1 | 1.00 | 1.00 | 2.00 | 0 | 0 | 0.500 | 0 | $9.22 \times 10^{-10}$ |
| Comparative Example 2 | 1.00 | 0 | 1.00 | 1.00 | 0 | 0 | 0.500 | $7.01 \times 10^{-9}$ |
| Comparative Example 3 | 0 | 1.00 | 1.00 | 1.00 | 0 | 1.00 | 0.500 | $<1.00 \times 10^{-10}$ |
| Comparative Example 4 | 1.00 | 1.00 | 0 | 4.00 | 0 | 0.500 | 1.00 | $3.80 \times 10^{-6}$ |

TABLE 3

| | Diffraction peak angle (°) |
|---|---|
| Example 1 | 30.10, 34.84, 50.19 |
| Example 2 | 30.05, 34.81, 50.12 |
| Example 3 | 30.00, 34.77, 50.08 |
| Example 4 | 30.10, 34.81, 49.98 |
| Example 5 | 30.03, 34.81, 50.19 |
| Example 6 | 30.06, 34.88, 50.20 |
| Example 7 | 12.79, 15.95, 21.15, 21.71, 24.50, 30.04, 31.59, 34.82, 50.10 |
| Example 8 | 18.53, 19.16, 27.23, 29.78, 30.06, 30.74, 31.35, 34.86, 48.24, 50.12 |
| Example 9 | 18.66, 19.25, 27.33, 29.77, 30.06, 30.76, 31.29, 34.87, 48.33, 50.20 |
| Example 10 | 18.66, 19.25, 27.34, 29.73, 30.08, 30.79, 31.25, 34.88, 48.42, 50.01 |
| Example 11 | 18.67, 19.23, 27.35, 29.73, 30.04, 30.77, 31.31, 34.84, 48.31, 50.20 |
| Example 12 | 18.59, 19.16, 27.26, 29.69, 30.11, 30.79, 31.36, 34.76, 48.31, 50.19 |
| Example 13 | 18.63, 19.20, 27.31, 29.73, 30.76, 31.51, 48.38 |
| Example 14 | 18.59, 19.23, 27.30, 29.65, 30.76, 31.32, 48.35 |
| Example 15 | 12.92 15.98, 21.18, 21.80, 24.65, 31.63 |
| Example 16 | 12.82, 15.89, 21.08, 21.80, 24.54, 31.58 |
| Example 17 | 12.82, 15.94, 21.13, 21.66, 24.50, 31.62 |

DISCUSSION

As is clear from Table 1, all of the solid electrolyte materials according to Examples 1 to 33 had high ionic conductivity of $1.0\times10^{-5}$ S/cm or more.

As is clear from comparing Example 7 and 28 to 32 with Example 33, a solid electrolyte material including CI has higher ionic conductivity.

As is clear from comparing Example 7 and 21 to 23 with Example 24, a solid electrolyte material having the molar ratio of 0 to Li being 0.80 or more and 1.10 or less has higher ionic conductivity.

The solid electrolyte materials according to Examples 1 to 12 each had, in the X-ray diffraction pattern obtained by X-ray diffraction measurement using a Cu-Kα ray, a peak within each of ranges of the diffraction angle 2θ from 28° to 32°, from 33° to 37°, and from 48° to 52°. In other words, the solid electrolyte materials according to Examples 1 to 12 included the first crystalline phase.

The solid electrolyte materials according to Examples 8 to 14 each had, in the X-ray diffraction pattern, a peak within each of ranges of the diffraction angle 2θ from 26° to less than 28.5° and from 47° to 50°. The solid electrolyte materials according to Examples 8 to 14 further each had at least two peaks within a range of the diffraction angle 2θ from 17° to 21°, and each had at least three peaks within a range of the diffraction angle 2θ from 28.5° to 33°. In other words, the solid electrolyte materials according to Examples 8 to 14 included the second crystalline phase. All of the solid electrolyte materials including the second crystalline phase had high ionic conductivity of $1.0\times10^{-4}$ S/cm or more.

The solid electrolyte materials according to Examples 7 and 15 to 17 each had, in the X-ray diffraction pattern, a peak within each of ranges of the diffraction angle 2θ from 11.5° to 14°, from 14.5° to 17°, from 23° to 25.5°, and from 29.5° to 33°, and each had at least two peaks within a range of the diffraction angle 2θ from 19.5° to 23°. In other words, the solid electrolyte materials according to Examples 7 and 15 to 17 included the third crystalline phase.

The solid electrolyte materials according to Examples 1 to 33 are free of sulfur, and accordingly generate no hydrogen sulfide.

The solid electrolyte material according to Example 1 exhibited favorable discharge characteristics in a battery including NCM as a positive electrode active material. Therefore, the solid electrolyte material of the present disclosure can be used together with a positive electrode active material that can be charged and discharged at a potential of 4 V or more. As a result, the solid electrolyte material of the present disclosure can improve the energy density of the battery.

As described above, the solid electrolyte material of the present disclosure is free of rare-earth elements and sulfur, has practical ionic conductivity, and is suitable for providing a battery that can be charged and discharged favorably.

INDUSTRIAL APPLICABILITY

The solid electrolyte material of the present disclosure is utilized, for example, in all-solid-state lithium-ion secondary batteries.

What is claimed is:

1. A solid electrolyte material being represented by the following composition formula (1), $$Li_aAl_bO_cX_d \quad \text{Formula (1)}$$

where values a, b, c, and d are each greater than 0, and X is at least one selected from the group consisting of Cl and Br, wherein a mathematical relation $0.545 \le d/(c+d) < 0.95$ is satisfied, and in Formula (1), b=1 and d satisfies a mathematical relation $1.0 \le d \le 2.5$.

2. The solid electrolyte material according to claim 1, wherein the X is Cl, or the X is Cl and Br.

3. The solid electrolyte material according to claim 1, wherein the solid electrolyte material includes a first crystalline phase, and in an X-ray diffraction pattern of the first crystalline phase obtained by X-ray diffraction measurement using a Cu-Kα ray, a peak is present within each of the ranges of a diffraction angle 2θ from 28° to 32°, from 33° to 37°, and from 48° to 52°.

4. The solid electrolyte material according to claim 1, wherein the solid electrolyte material includes a second crystalline phase, and in an X-ray diffraction pattern of the second crystalline phase obtained by X-ray diffraction measurement using a Cu-Kα ray, at least one peak is present within a range of a diffraction angle 20 from 26° to less than 28.5°, and at least three peaks are present within a range of the diffraction angle 2θ from 28.5° to 33°.

5. The solid electrolyte material according to claim 4, wherein in the X-ray diffraction pattern of the second crystalline phase, at least one peak is present within a range of the diffraction angle 2θ from 47° to 50°, and at least two peaks are present within a range of the diffraction angle 2θ from 17° to 21°.

6. The solid electrolyte material according to claim 1, wherein the solid electrolyte material includes a third crystalline phase, and in an X-ray diffraction pattern of the third crystalline phase obtained by X-ray diffraction measurement using a Cu-Kα ray, at least one peak is present within each of the ranges of a diffraction angle 2θ from 11.5° to 14°, from 14.5° to 17°, from 23° to 25.5°, and from 29.5° to 33°, and at least two peaks are present within a range of the diffraction angle 20 from 19.5° to 23°.

7. The solid electrolyte material according to claim 1, wherein a mathematical relation $b/(a+b)>0.4$ is satisfied.

8. The solid electrolyte material according to claim 1, wherein a mathematical relation $b/(a+b)<0.95$ is satisfied.

9. A battery comprising:

a positive electrode;

a negative electrode; and an electrolyte layer disposed between the positive electrode and the negative electrode, wherein at least one selected from the group consisting of the positive electrode, the negative electrode, and the electrolyte layer includes the solid electrolyte material according to claim 1.

* * * * *